(12) United States Patent
Watson

(10) Patent No.: US 8,589,858 B1
(45) Date of Patent: Nov. 19, 2013

(54) REQUIREMENT MANAGER FOR UML AND SYSML APPLICATION

(75) Inventor: John Watson, Levittown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 1101 days.

(21) Appl. No.: 12/559,050

(22) Filed: Sep. 14, 2009

(51) Int. Cl.
*G06F 9/45* (2006.01)

(52) U.S. Cl.
USPC .......................................................... 717/100

(58) Field of Classification Search
USPC .......................................................... 717/100
See application file for complete search history.

(56) References Cited

U.S. PATENT DOCUMENTS

| | | | | |
|---|---|---|---|---|
| 8,191,044 | B1 * | 5/2012 | Berlik et al. | 717/124 |
| 2002/0062475 | A1 * | 5/2002 | Iborra et al. | 717/108 |
| 2005/0138039 | A1 * | 6/2005 | Hagen | 707/100 |
| 2006/0037019 | A1 * | 2/2006 | Austin et al. | 718/100 |
| 2009/0125546 | A1 * | 5/2009 | Iborra et al. | 707/102 |

OTHER PUBLICATIONS

Moreira et al., A Concern-Oriented Requirements Engineering Model, 2005, ACM, p. 293-308.*
Friedenthal et al., "OMG Systems Modeling Language (OMG SysML tm) Tutorial", INCOSE 2008, Systems Engineering for the Planet, The Netherlands Jun. 15-19, 2008, 132 pages.

* cited by examiner

*Primary Examiner* — John Chavis
(74) *Attorney, Agent, or Firm* — Howard IP Law Group, PC

(57) ABSTRACT

A system for displaying relationships between data of one of a UML or a SysML application includes a machine readable storage medium and a processor. The machine readable storage medium is configured to store a plurality of data for a project designed using one of the UML or the SysML applications. The processor is in signal communication with the machine readable storage medium. The processor is configured to search the computer readable storage medium for a first model element, identify a requirement relationship between the first model element and a second model element, and display the first model element and the second model element on a monitor such that the requirement relationship between the first model element and the second model element is identifiable to a user.

29 Claims, 13 Drawing Sheets

REQUIREMENT MANAGER FOR UML AND SYSML APPLICATION

GOVERNMENTAL INTEREST

This invention was made with Government support under contract No. N00024-98-C-5197 awarded by the Department of the Navy. The Government has certain rights in this invention.

FIELD OF DISCLOSURE

The disclosed system and method relate to systems engineer modeling applications. More specifically, the disclosed system and method relate to unified modeling language (UML) and systems modeling language (SysML) applications.

BACKGROUND

Systems and software engineering is commonly used in all types of complex projects such as spacecraft design, computer chip design, robotics, software integration, bridge building, or the like. Traditionally, this effort was accomplished utilizing documents to capture the details of the system architecture and design. Today, the industry utilizes model-based systems engineering techniques to capture the details of the system architecture and design, which frequently employ applications that use unified modeling language (UML) and/or systems modeling language (SysML). The languages enhance a designer's ability to integrate the visual and textual representation of system's design and architecture. The modeling language tools can be used to create modeling elements that are used to describe the behavior and structural characteristics of a system's design or architecture.

FIG. 1 illustrates an example of a conventional development system 102, which includes an application 104 applying a UML/SysML modeling language that is in signal communication with a database 106. Clients 110a-110e may be computers that are used by users or designers to gain access to the UML/SysML development system 102 through a network 108. Each user may use the system 102 to create and make changes to the system or project under design. The data for the system or project under design is stored in the database 106. The UML/SysML applications that utilize UML or SysML languages such as, for example, Rational Rose or Rhapsody available from International Business Machines Corporation of Armonk, N.Y., lack completely integrated tools that enable a user to manage the quantity and quality of the requirements and the relationship of those requirements to other modeling elements of the system or project under design.

Accordingly, an improved system and method for managing requirements in a system modeling environment are desirable.

SUMMARY

A system for displaying relationships between data of a project designed with an application utilizing one of a unified modeling language (UML) or a system modeling language (SysML). The system includes a machine readable storage medium and a processor in data communication with the computer readable storage medium. The machine readable storage medium is configured to store a plurality of data for a project designed using one of the UML or the SysML applications. The processor is configured to search the computer readable storage medium for a first model element of the project, identify a requirement relationship between the first model element and a second model element, and display the first model element and the second model element on a monitor such that the relationship between the first project requirement and the first project element is identifiable to a user.

In some embodiments, a computer readable storage medium is encoded with program code, wherein when the program code is executed by a processor, the processor performs a method. The method includes searching for a first model element, identifying a requirement relationship between the first model element and a second model element, and displaying the first model element and the second model element such that the requirement relationship between the first model element and the second model element is identifiable to a user. The project designed using one of a UML or a SysML application.

In still further embodiments, a method for displaying requirement relationships between data of one of a UML or a SysML application. The method includes searching for a first model element, identifying a requirement relationship between the first model element and a second model element, and displaying the first model element and the second model element such that the requirement relationship between the first model element and the second model element is identifiable to a user. The project designed using one of a UML or a SysML application.

The above and other features of the present disclosure will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention as well as other information pertinent to the disclosure.

DETAILED DESCRIPTION

With reference to FIGS. 2-5D, a requirements management tool (RMT) 500 is now described. As described above, UML/SysML applications are used to aide in the design of complex systems or other engineering projects. These UML/SysML systems are used to develop different models each having a multitude of elements. For example, a particular project may include one or more operational models, one or more system models, and one or more component models. Many, if not all, of these models include a plurality of elements or components each having a multitude of requirements that the system or project under design may perform. Thus, as the system or project is developed and becomes increasingly more complex, an element may have hundreds or thousands of requirements all or some of which may be interrelated or dependent upon other elements in other models. Additionally, each of the models may include a set of rules and/or guidelines that must be followed in developing the system or project under design. For example, a rule may exist that a system requirement may only be satisfied by one model element.

Advantageously, the RMT 500 may be fully integrated with the UML/SysML application such that it provides a real-time view of the selected model elements and the requirement relationships between these model elements. Unlike conventional tools, such as IBM® Rational® DOORS® available from International Business Machines Corporation of Armonk, N.Y., the RMT 500 does not require periodic synchronization between with the UML/SysML application. Instead, changes made in either the RMT 500 or the UML/SysML application are seen as they occur, e.g., in real-time. Depending on the one or more model elements selected by a user, the RMT 500 will presents a user with a list of pertinent information relative to the selected model elements including the requirement relationships to other model elements and the model elements that have requirement relationships to the selected model elements. Advantageously, any type of model element may be selected or searched by the RMT 500. Once the model element selection has been made, the RMT mines a database including the project data of the project under design by looking at each of the selected model elements and model elements within these selected elements for requirement relationships to other model elements. Additionally, the model elements that have requirement relationships to the found model elements may also be identified and the results of the data mining presented to the user along with the metrics captured during the mining process.

Figure 1:
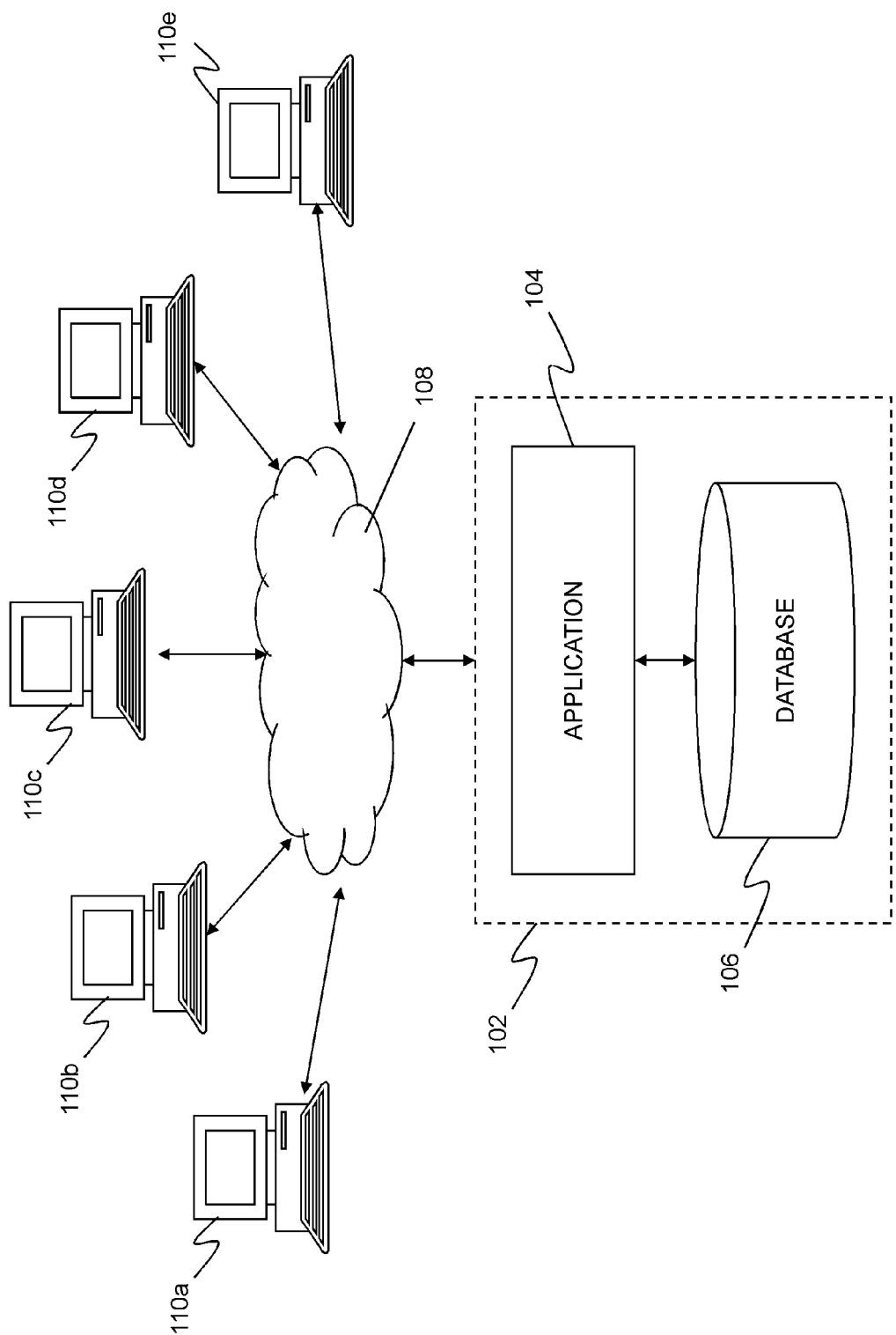
FIG. 1 illustrates a conventional architecture of a system utilizing a UML and/or a SysML.
Figure 2A:
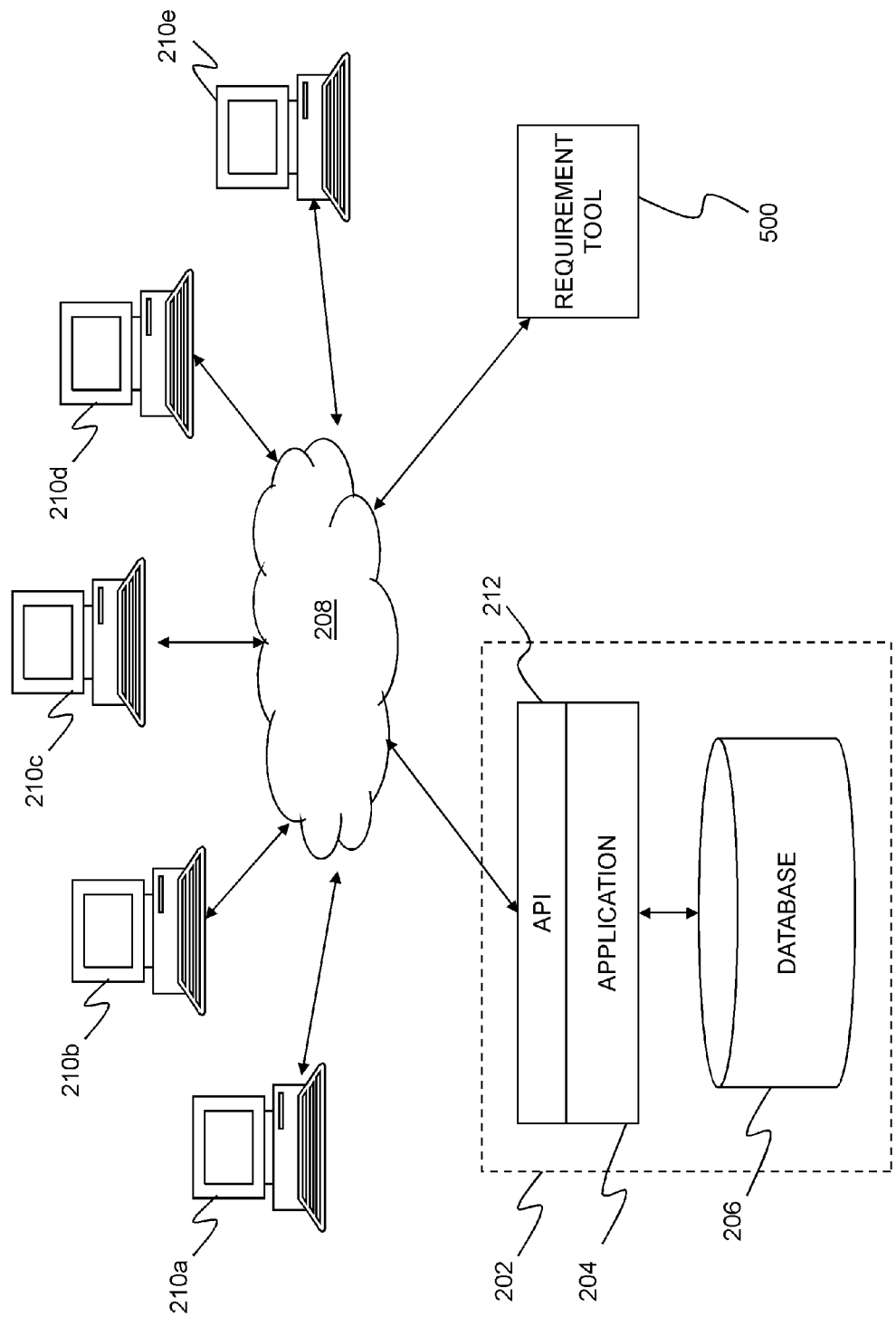
FIGS. 2A-2B illustrate a real-time requirement management tool in communication with a UML/SysML system.
Figure 2B:
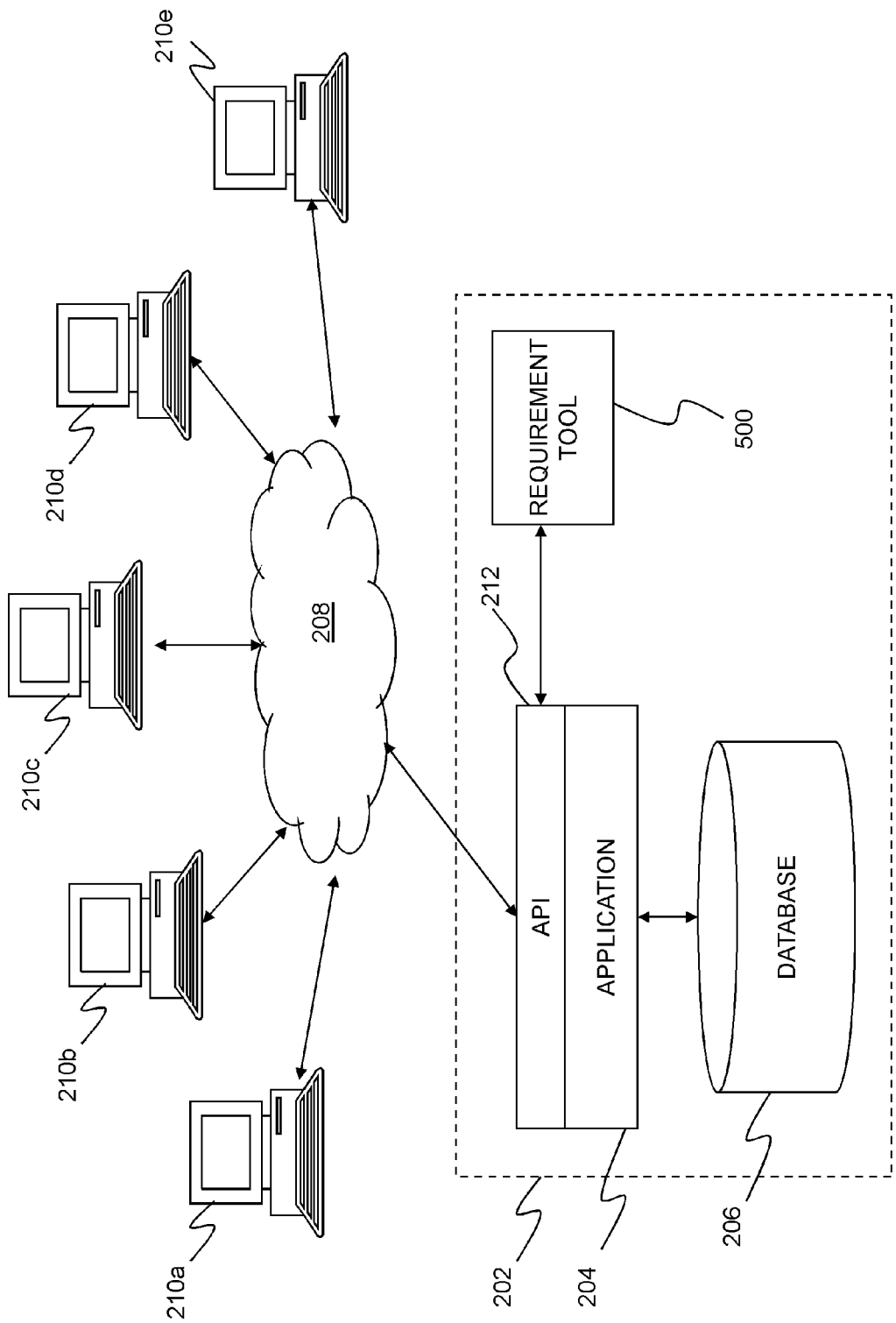
Figure 3:
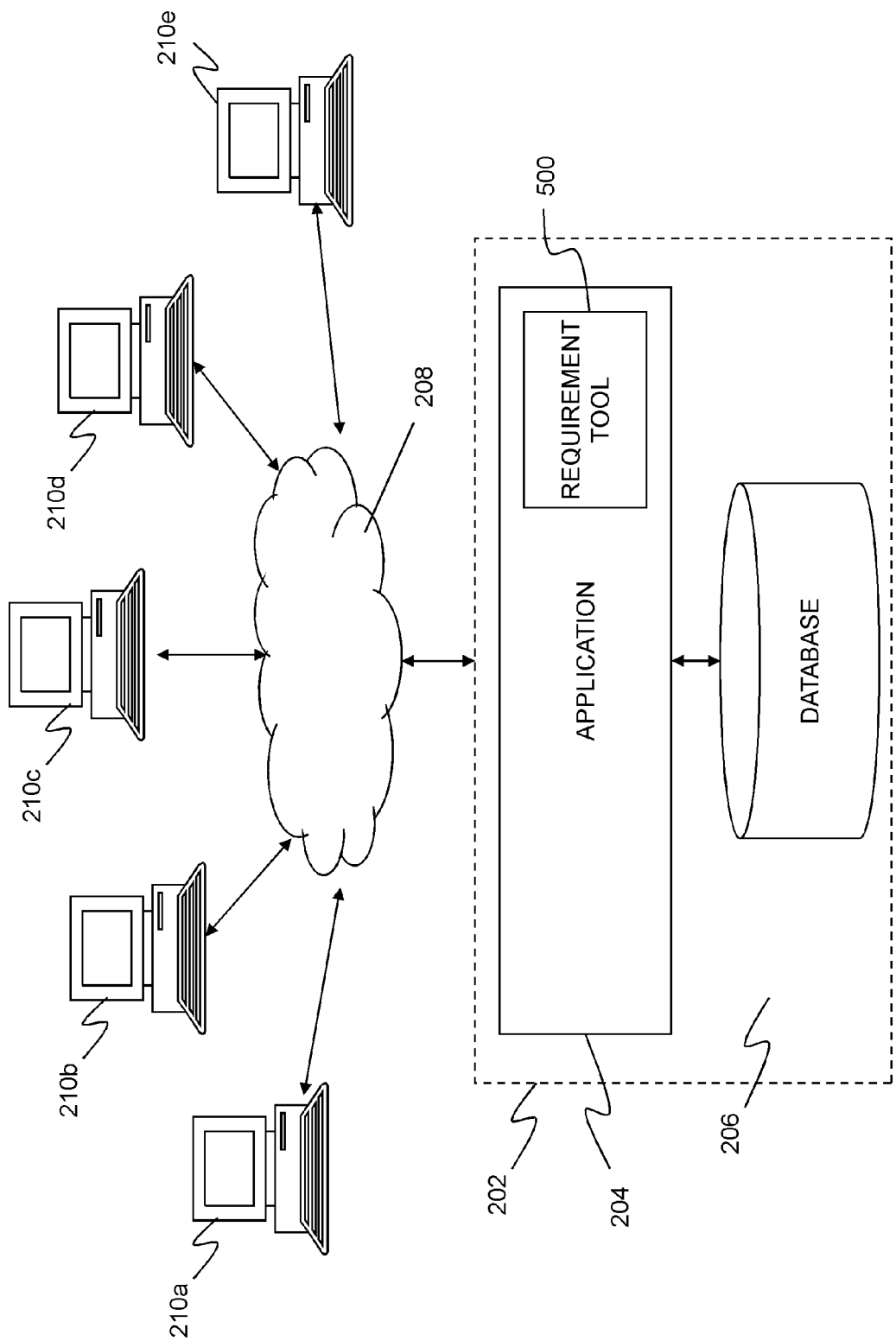
FIG. 3 illustrates another implementation of a requirements management tool in communication with a UML/SysML system.

In some embodiments, the requirement management tool (RMT) 500 may be implemented on a machine that is separate from the machine running the UML and/or SysML application. In these embodiments, the RMT 500 may interface with a UML and/or SysML application through a real-time interface such as the application programming interface (API) 212 of the UML or SysML system 202 as illustrated in FIGS. 2A and 2B, but still maintains a real-time perspective of the requirements to modeling elements. Implementing the RMT 500 through the UML/SysML application's API 212 enables the RMT 500 to present the requirements information of the current system under design in real time. Alternatively and as illustrated in FIG. 3, the RMT 500 may be implemented as part of a UML/SysML system. In some embodiments, the RMT 500 may be implemented using C, C#, Visual Basic, C++, Java, or other programming language.

Regardless of implementation, the RMT 500 may be configured to mine data of the UML/SysML application as well as perform a variety of functions that enable one or more users 210*a*-210*e* to efficiently and effectively manage the requirements of the system or project under design. Examples of the functions that may be performed by a RMT 500 include, but are not limited to, filtering views of one or more structural or behavioral model elements of the system, filtering attributes on requirements, managing the quality of requirements, tracing the paths of requirements, managing the requirements via the use of metrics, capturing a set of requirements allocated to a model elements, and various searching as described below.

Figure 4:
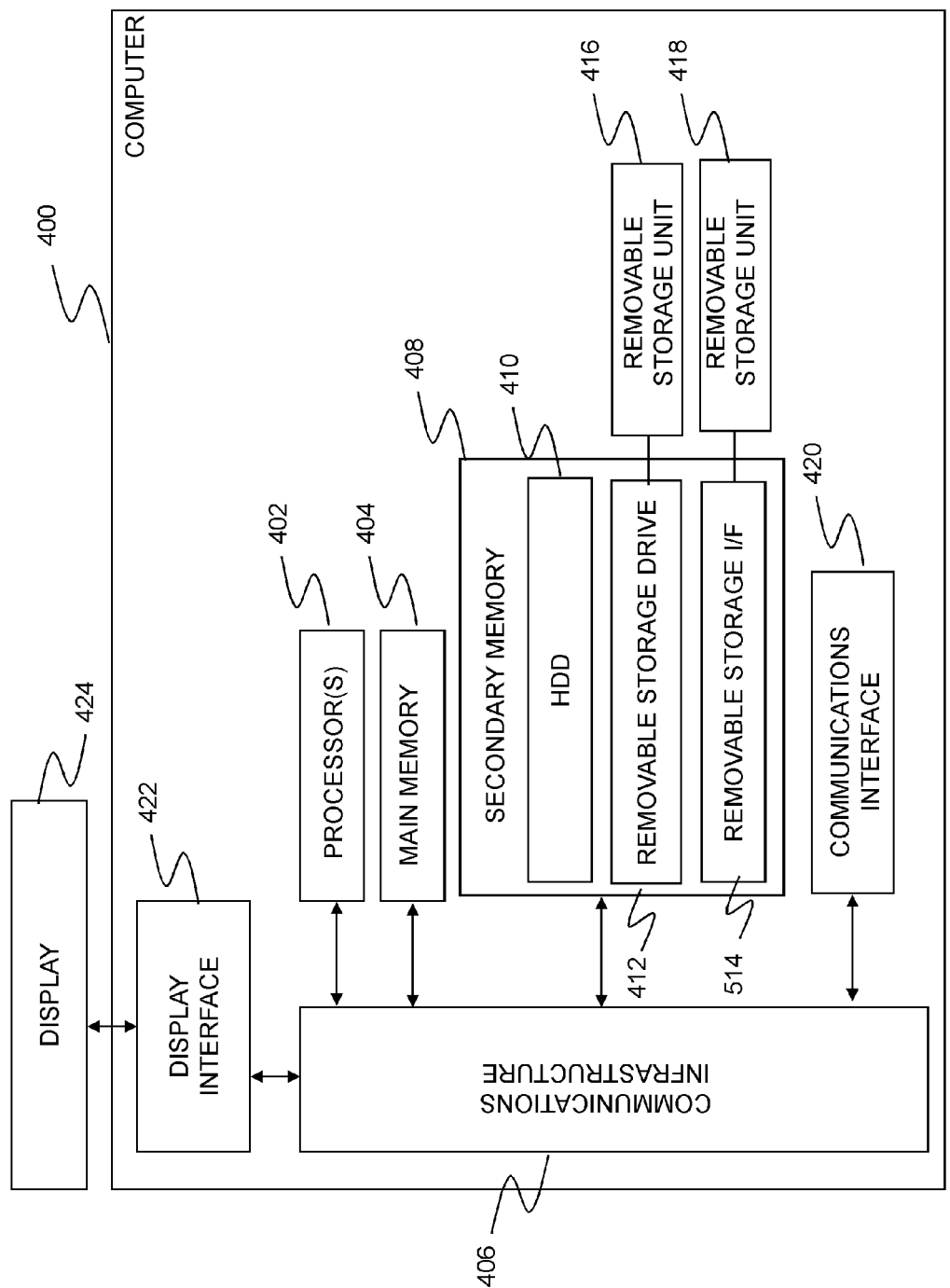
FIG. 4 is one example of a computer architecture that may be configured to implement the requirements management tool.

The RMT 500 may be implemented in software and presented to a user on a monitor or other display device. In some embodiments, the RMT 500 may be presented to a user as a graphical user interface (GUI) on a display device such as a computer monitor. FIG. 4 illustrates one example of an architecture of a computer system 400 configured to implement the RMT 500. As illustrated in FIG. 4, computer system 400 may include one or more processors 402. The processor 402 is connected to a communication infrastructure 406 (e.g., a communications bus, cross-over bar, or network). Computer system 400 may include a display interface 422 that forwards graphics, text, and other data from the communication infrastructure 406 (or from a frame buffer not shown) for display on the display unit 424.

Computer system 400 also includes a main memory 404, such as a random access memory (RAM), and a secondary memory 408. The secondary memory 408 may include, for example, a hard disk drive (HDD) 410 and/or removable storage drive 412, which may represent a floppy disk drive, a magnetic tape drive, an optical disk drive, or the like. The removable storage drive 412 reads from and/or writes to a removable storage unit 416. Removable storage unit 416 may be a floppy disk, magnetic tape, optical disk, or the like. As will be understood, the removable storage unit 416 may include a computer readable storage medium having stored therein computer software and/or data.

In alternative embodiments, secondary memory 408 may include other similar devices for allowing computer programs or other instructions to be loaded into computer system 400. Secondary memory 408 may include a removable storage unit 418 and a corresponding interface 414. Examples of such removable storage units include, but are not limited to, USB or flash drives, which allow software and data to be transferred from the removable storage unit 418 to computer system 400.

Computer system 400 may also include a communications interface 420. Communications interface 420 allows software and data to be transferred between computer system 400 and external devices. Examples of communications interface 420 may include a modem, Ethernet card, wireless network card, a Personal Computer Memory Card International Association (PCMCIA) slot and card, or the like. Software and data transferred via communications interface 420 may be in the form of signals, which may be electronic, electromagnetic, optical, or the like that are capable of being received by communications interface 420. These signals may be provided to communications interface 420 via a communications path (e.g., channel), which may be implemented using wire, cable, fiber optics, a telephone line, a cellular link, a radio frequency (RF) link and other communication channels.

In this document, the terms "computer program medium" and "computer readable storage medium" refer to media such as removable storage drive 412, or a hard disk installed in hard disk drive 410. These computer program products provide software to computer system 400. Computer programs (also referred to as computer control logic) are stored in main memory 404 and/or secondary memory 408. Computer programs may also be received via communications interface 420. Such computer programs, when executed by a processor, enable the computer system 400 to perform the features of the method discussed herein. For example, main memory 404, secondary memory 408, or removable storage units 416 or 418 may be encoded with computer program code for performing the process shown in FIG. 6.

In an embodiment implemented using software, the software may be stored in a computer program product and loaded into computer system 400 using removable storage drive 412, hard drive 410, or communications interface 420. The software, when executed by a processor 402, causes the processor 402 to perform the functions of the method described herein. In another embodiment, the method may be implemented primarily in hardware using, for example, hardware components such as a digital signal processor comprising application specific integrated circuits (ASICs). In yet another embodiment, the method is implemented using a combination of both hardware and software.

The RMT 500 may be configured to enable a user to select a set of requirements related to one or more model, structural, or behavioral model elements and view them from a requirements perspective. For example, the view selection functionality of the RMT 500 enables a user to select one or more model elements and identify related requirements across several models. The RMT 500 may display the requirements to a user in a hierarchical tree in which requirements may be expanded or collapsed by a user so that the user may see, e.g., be able to identify, related requirements.

Figure 5A:
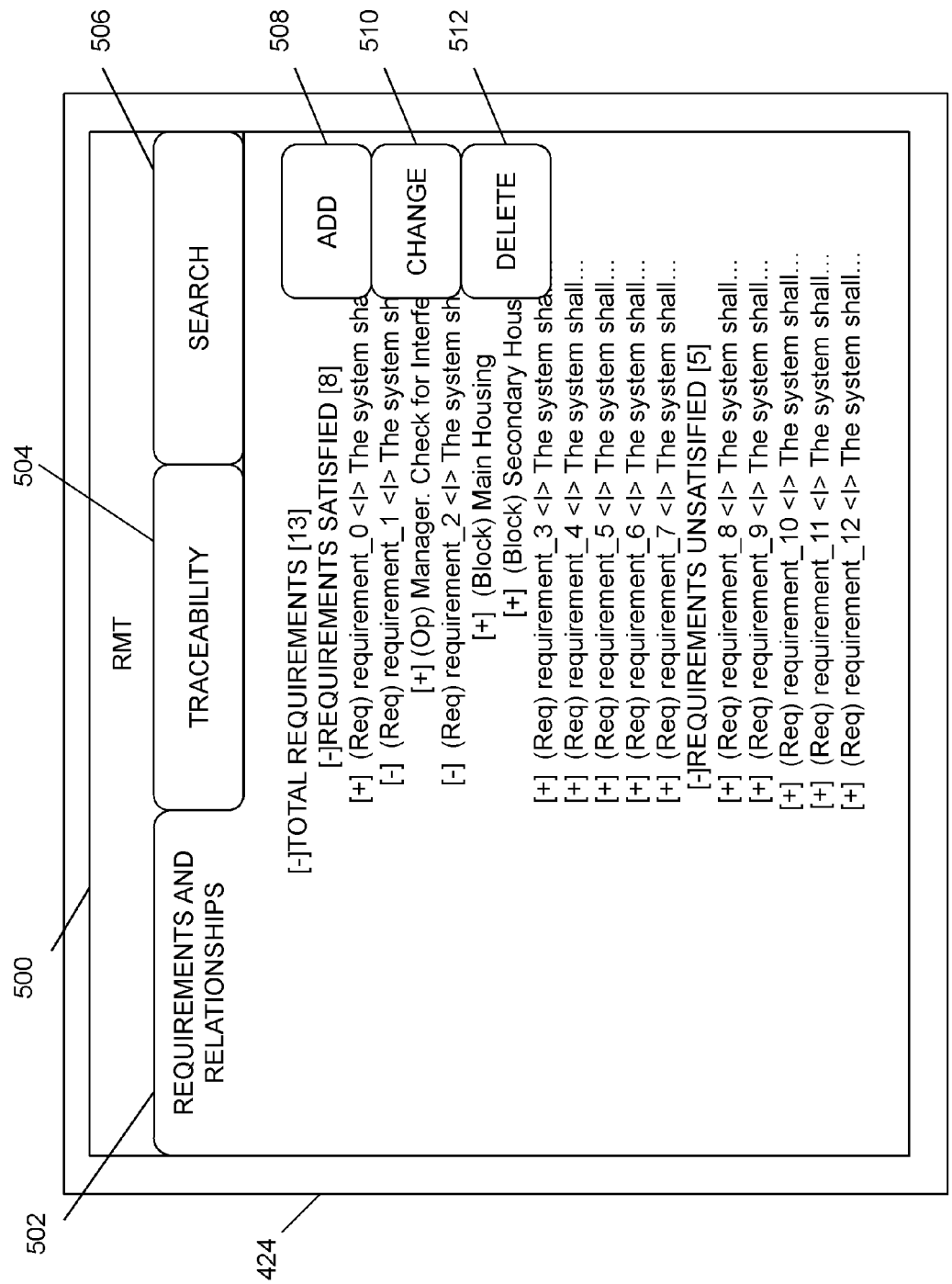
FIGS. 5A-5C illustrate various examples of graphical user interfaces of a requirements management tool.
Figure 5B:
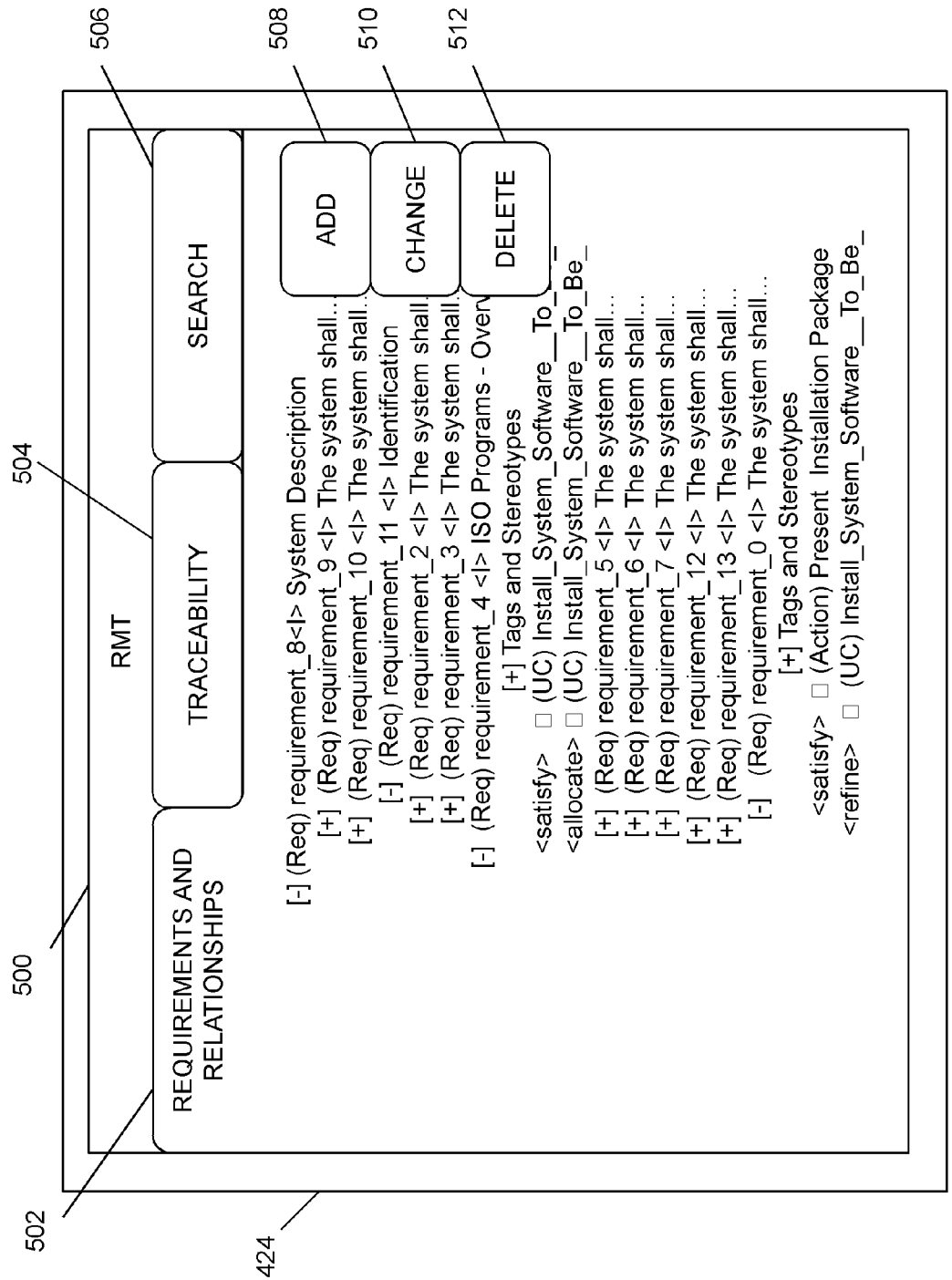
Figure 5C:
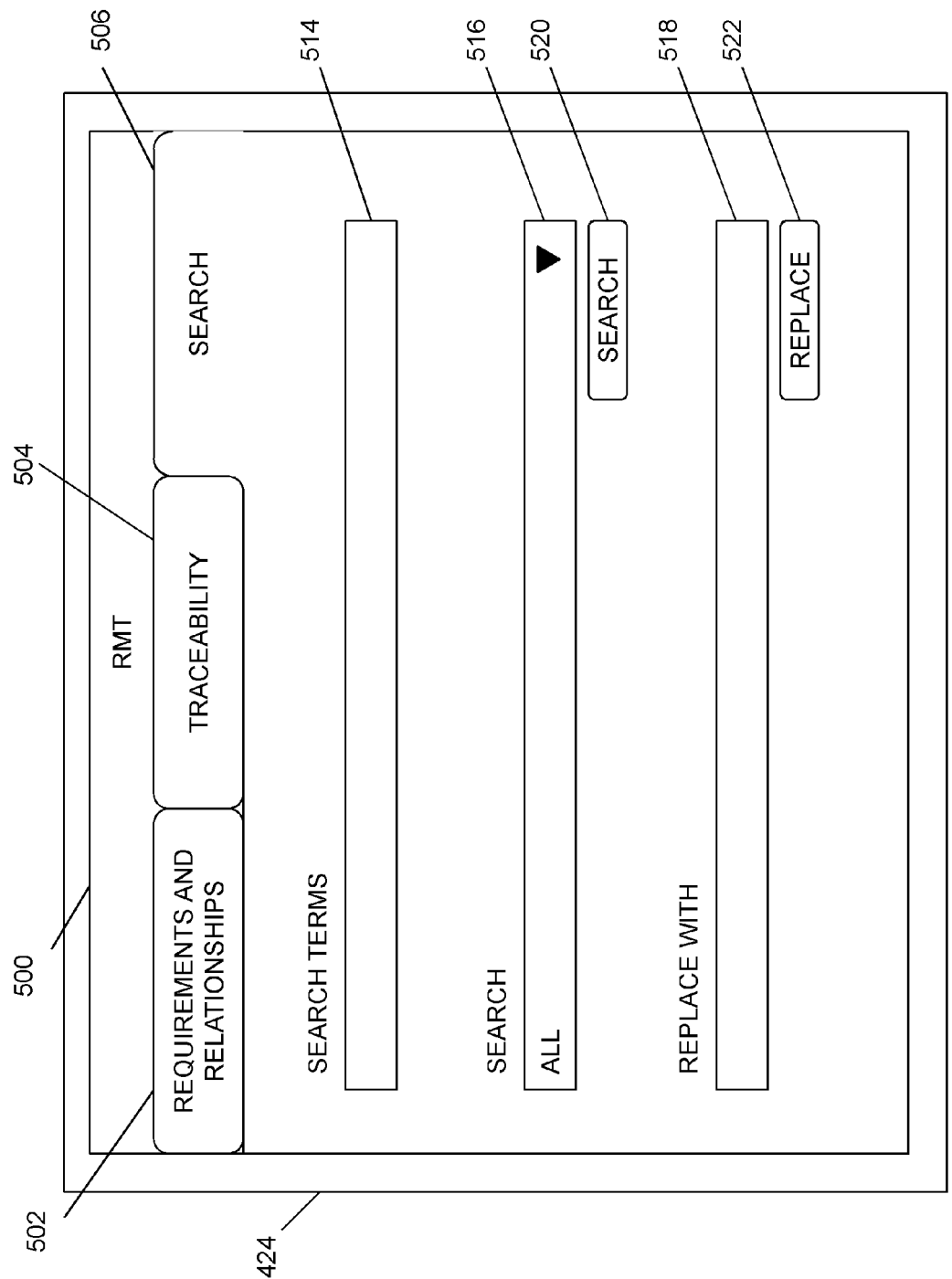

As illustrated in FIGS. 5A-5C, a plurality of tabs 502-506 may be provided for a user to access one or more predetermined functions or views provided by the RMT 500. For example, a Requirements tab 502 may be provided that displays all of the requirements (Req) of a system under design or of a particular model element subassembly or sub-system of the system or project under design. Additionally, a predetermined function or view provided by the RMT 500 can include a requirements satisfaction view, a requirements traceability view, and a view revealing requirements associated with all model elements contained on one or more UML/SysML defined diagrams.

FIG. 5A illustrates one example of a Satisfy Requirements tab 502 of an RMT 500 displayed on a monitor 424. As shown in FIG. 5A, a list of requirements of the system under design that have or have not been satisfied as well as a count of each. One skilled in the art will understand that there are several reasons for which a requirement may not be satisfied. For example, a requirement may not be satisfied because a model element has not been identified in the database as satisfying the requirement, e.g., the requirement does not have a requirement relationship associated with it. A requirement may also not be satisfied due to too many model elements being associated with in violation of a system rule or guideline. For example, if a system rule or guideline is that a requirement may be met by one model element, the RMT 500 may identify a number of requirements which are identified as being satisfied by two or more model elements as not being satisfied or as being incorrectly satisfied.

Displaying a list and a count of all of the requirements that have or have not been satisfied enables a user to quickly and easily determine what parts of the system or project under design need to be addressed as well as to ascertain the quality and correctness of recent tasks that have been performed on the system model. Additionally, by implementing the RMT 500 using the application's API 204 advantageously enables a user to determine if a change in metrics, e.g., a requirement, or other change, has been implemented in real-time. Knowing a metrics count before and after a change is made enables a user to quickly determine if in fact the change was made in the application 204. One skilled in the art will understand that the metrics counts may be subdivided into a number of types of relationships to other model elements to provide a fine resolution of the total count and enabling a user to identify where there are differences in the model or system under design.

As shown in FIGS. 5A and 5B, related and/or dependent requirements may be presented to a user in an expandable/collapsible hierarchical view such as a browser tree or outline view. This provides the capability of initially viewing the hierarchically organized information in a simplified collapsed view allowing the user to start at a high level and selectively drill down through the hierarchical levels of specific model elements only if more detail is needed. Presenting a user with a list of requirements and other model elements that may be spread across various models enables a user to quickly view the relevant information required to evaluate the model. This evaluation can include identifying if there are any redundant or overlapping requirements as well as understanding how the models and components of the system under design are related to each other through a requirement relationship. Examples of requirement relationships include, but are not limited to, a satisfaction, a derived, a refined, a verify, a decompose, a copy, and an allocation relationship. Accordingly, RMT 500 enables requirement relationships between requirements to be traced. For example, a low-level model element may have a certain requirement, which may then lead to certain design or engineering decisions at a higher level based on this requirement. The RMT 500 may be used to trace a requirement from the top-down or from the bottom-up enabling users to identify why a decision concerning a certain design or engineering feature was made without requiring the user to manually follow a requirement through the various levels of a system.

RMT 500 may be configured to enable a user to add, change, or delete requirements using one of the buttons 508, 510, 512, to perform the add, change, or delete operation, respectively. For example, if a user wants to change a property of requirement_4 as shown in FIG. 5B, then the user may use an input device, e.g., a mouse, a keyboard, or like device, to highlight requirement_4 and then click the "CHANGE" button 508. The user may then be presented with a dialogue box querying as to what type of property the user would like to change. The user may make the appropriate selection and change to the system or model under design, e.g., by storing it in database 206. This change is made in real-time and does not require the RMT 500 to be synchronized with the UML/SysML application.

FIG. 5C illustrates one example of RMT 500 displaying the features of the search tab 506. As shown in FIG. 5C, the search tab 506 may provide users the ability to perform a variety of searches in the database 206 containing the data for the system or project under design. For example, a user may perform a keyword search for word strings in the entire system under design by entering the string in field 514 and clicking the "SEARCH" button 520. Additionally, a terms and connectors search using Boolean search commands may also be implemented as will be understood by one skilled in the art. More refined searching may also be available such as, for example, searching for a particular requirement by entering the particular word or phrase in field 514 and selecting the appropriate category from pull-down menu 516. The RMT 500 will search the database 206 to locate the one or more requirements or other model elements. Once the one or more requirements or other model elements have been located, the RMT 500 will also locate all requirement relationships of the model element and display the searched requirement and the related requirements on a display. The Search tab 506 may also include a find and replace function using field 518 and button 522. Accordingly, a user may enter a keyword or search string into field 514 along with replacement word or string in field 518 and then click button 522 to make the replacements.

Accordingly, RMT 500 enables quality management of the entire system under design as the various views enable a user to identify the completeness of the model. In contrast, conventional systems require a user to move up and down through various model organizations to view one requirement at a time. Accordingly, it is difficult in conventional systems for a user to view and manage a set of related requirements and associated elements across the various models.

Figure 6A:
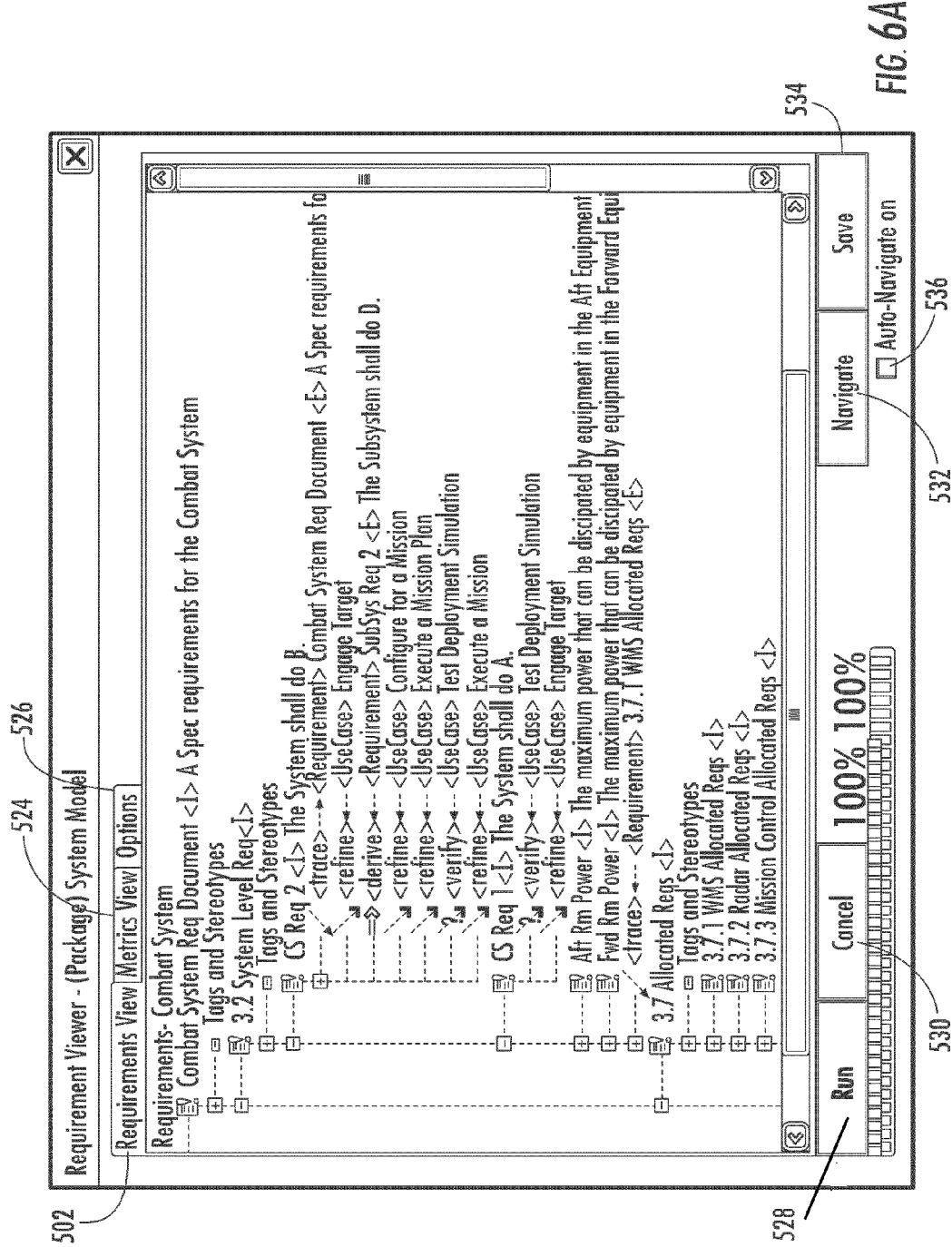
FIGS. 6A-6C illustrate other various examples of graphical user interfaces of a requirements management tool.
Figure 6B:
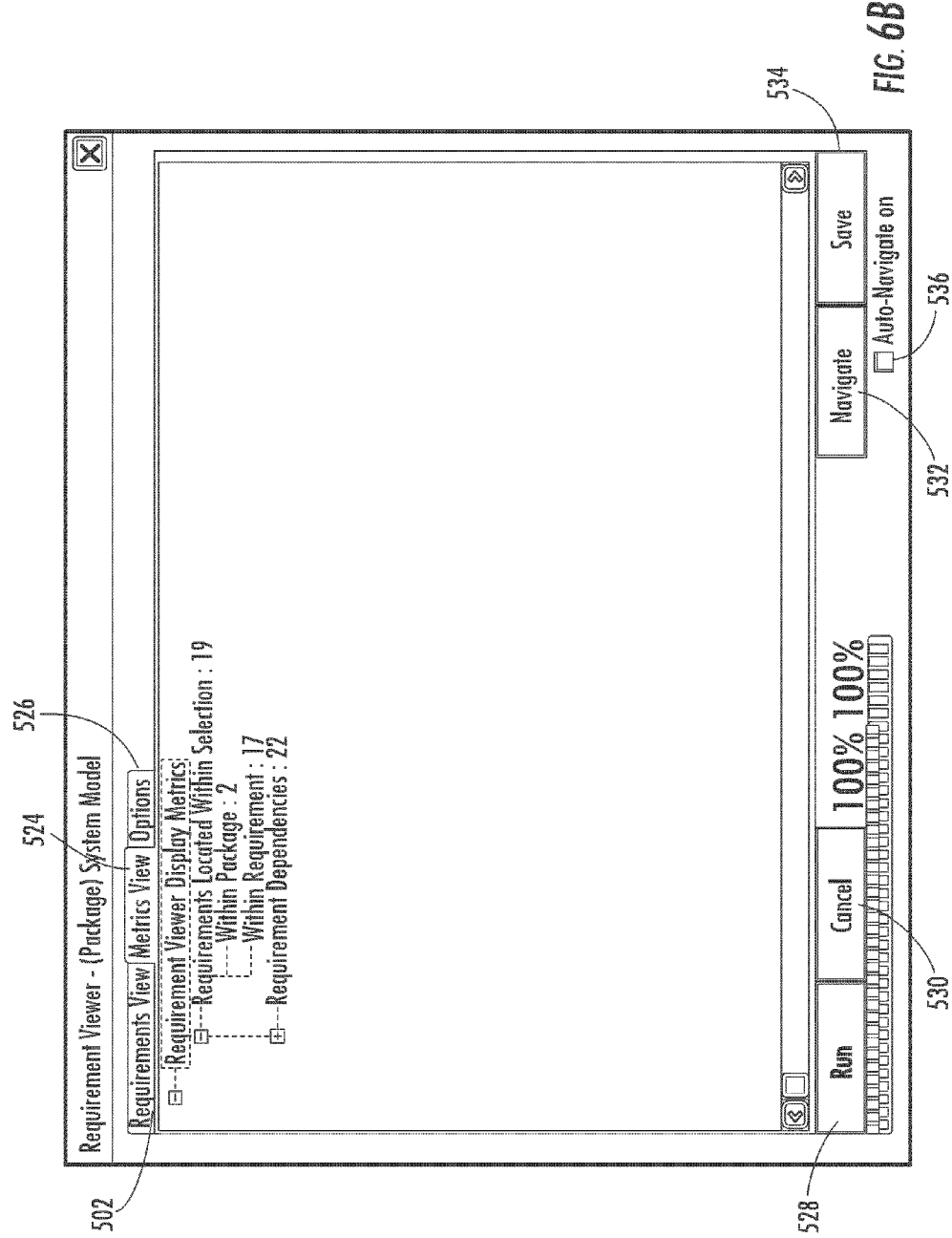
Figure 6C:
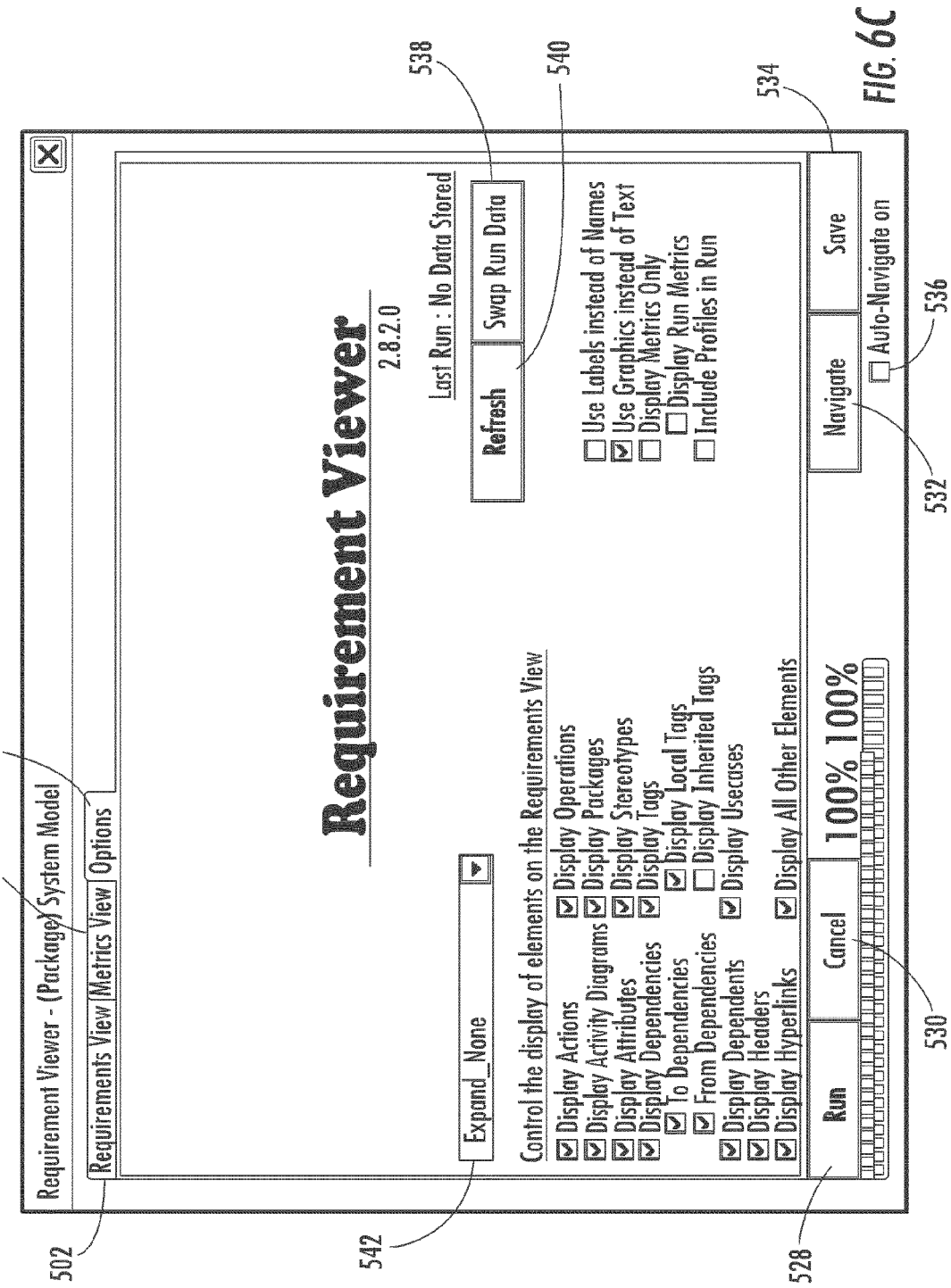

FIGS. 6A-6C illustrate another example of GUIs that may be provided to a user of the RMT 500. As shown in FIG. 6A, the RMT 500 may include a Requirements View tab 502, a Metrics View tab 524, and an Options tab 526. The requirements tab 502 illustrated in FIG. 6A includes a Run button 528, a Cancel button 530, a Navigate button 532, a Save button 534, and a check box 536. In the application browser of the UML/SysML application, a user may select a model element using an input device such as a mouse, a keyboard, a touch screen, or the like. Alternatively, a user may enter one or more search terms using Boolean connectors and the application will identify model elements that match the search criteria. Once a selection has been made, e.g., once a user has selected one or more elements in the model element browser or the application has identified model elements matching the search criteria, the user may press the Run button 528 and the RMT 500 begins mining data in database 206. If the mining operation is taking too long, the Cancel button 530 can be used to terminate the mining operation. Once the data mining is complete, the results may be displayed to a user, and the user may navigate from any item displayed by the RMT 500 to the same item in the model element browser. If the Auto-Navigate onClick box 536 is checked, then user may simply select the displayed item in the RMT display. If Auto Navigate onClick box 536 is not checked, the user selects the item in the RMT display and then selects the Navigate button. The Save button provides the ability to save the complete resulting mining results to a selected file for later examination or archiving.

FIG. 6B illustrates one example of a Metrics View tab 524. As shown in FIG. 6B, the Metrics View tab 524 includes the same buttons 528-536 provided on the Requirements View tab 502. The Metrics View tab 524 displays the metrics of various requirement related counts found in the mining activity displayed on the Requirement View tab. Various counts are displayed depending on the contents of the data mined. Additionally, the total number of requirements within the selection and the number of requirement dependencies are presented. The "+" indicates that additional metrics are available within these categories of counts. When the "+" is selected by a user, the additional counts are displayed and the "+" changes to a "−". As shown in FIG. 6B, the counts for the requirements within a package and within requirements are displayed. If additional sub-categories are available, additional "+" indicators are presented and the user may expand these subcategories to drill down deeper and obtain more refined counts.

FIG. 6C illustrates one example of the Options tab 526. As shown in FIG. 6C, a user is presented with a number of check boxes 536 that enable the user to customize the display and attributes associated with the selection of elements on the Requirements View tab 502. Such customizations include, but are not limited to, displaying associated actions, activity diagrams, attributes, dependencies, headers, hyperlinks, operations, packages, stereotypes, display tags, or the like. Additionally, check boxes 536 may enable the users to select if they want to view labels instead of names, graphics instead of text, only metrics, and whether or not they want to include profiles in the search. One skilled in the art will understand that the GUIs provided by RMT 500 may have various arrangements and content.

Figure 7:
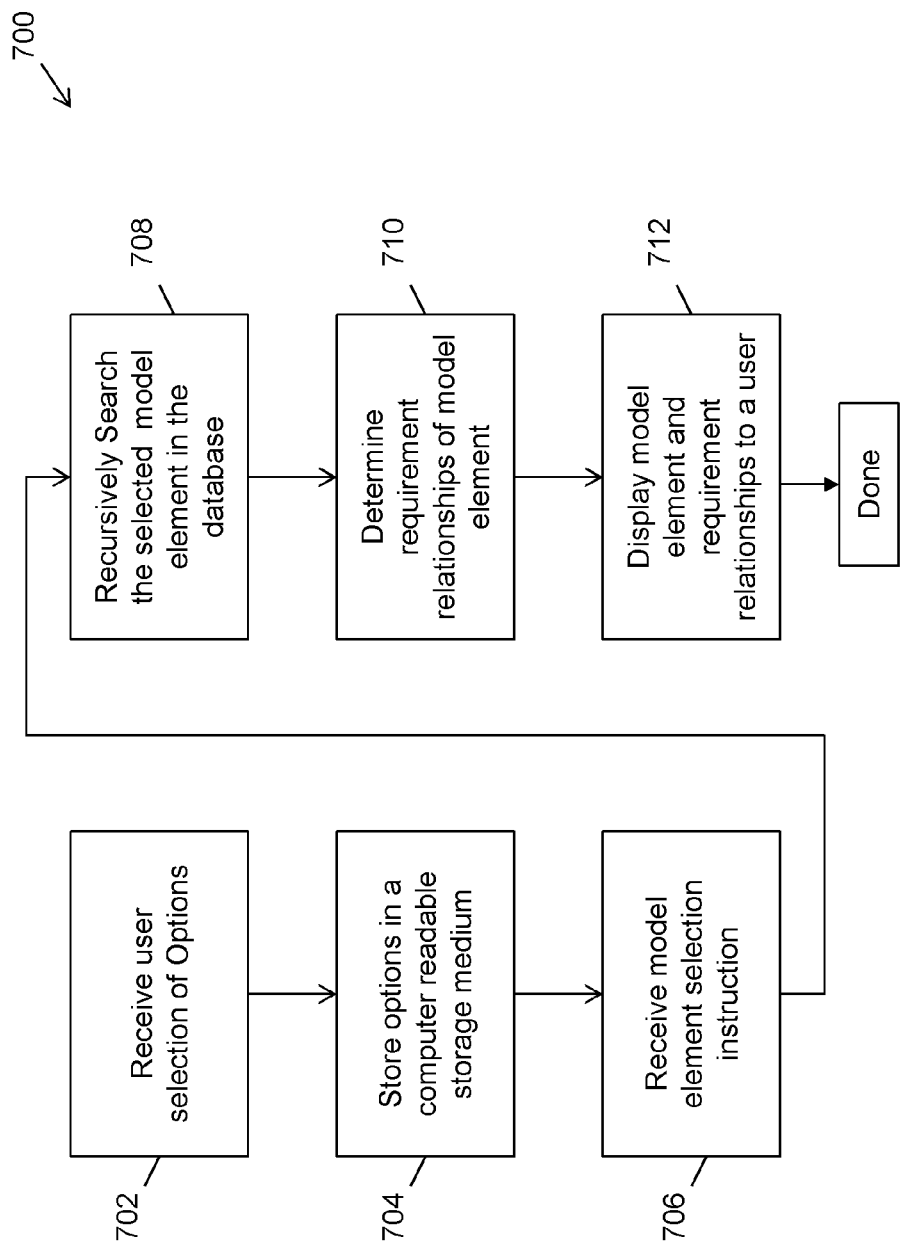
FIG. 7 is a flow diagram of one example of a method that may be performed by a requirements management tool.

FIG. 7 illustrates one example of a method 700 of retrieving and presenting data of a system being designed using UML and/or SysML that may be performed by RMT 500. At block 702, the RMT 500 receives the display options selected by a user in the Options tab 526. The display options may be stored in a computer readable storage medium such as a main memory 404 or a secondary memory 408 at block 704. At block 706, the instructions from a user identifying a selection of one or more model elements is received by the RMT 500. In this example, the instructions may be received by the RMT 500 in response to a user selecting a model element in the application browser of the UML/SysML application. As described above, the user may make the selection using an input device such as a mouse, a keyboard, a touch screen, or the like and clicking or otherwise selecting a model element.

At block 708, the RMT 500 searches (mines) database 204 for the selected one or more model elements. The selected model elements are mined recursively searching through the selected model elements until all model elements are examined. All requirement relationships of the model elements are identified at block 710. For example, the RMT 500 may identify all satisfaction, derived, refined, verify, decompose, copy, and an allocation relationships for the one or more model elements. It is understood that RMT 500 may search for a sub-set of these model elements such as, for example, searching only for requirements or searching for requirements and use cases.

At block 712, the mined data are displayed to a user such that model elements having requirement relationships to other model elements may be identified by a user. This may include displaying the mined data in an expandable tree or other format in which the user may readily ascertain how requirements are related to model elements. In addition, metrics collected during the data mining performed by the RMT 500 may be displayed to assist the user in analyzing the collected information. The model elements and associated requirement relationships are displayed in accordance with the display options stored in the computer readable storage medium.

Figure 8:
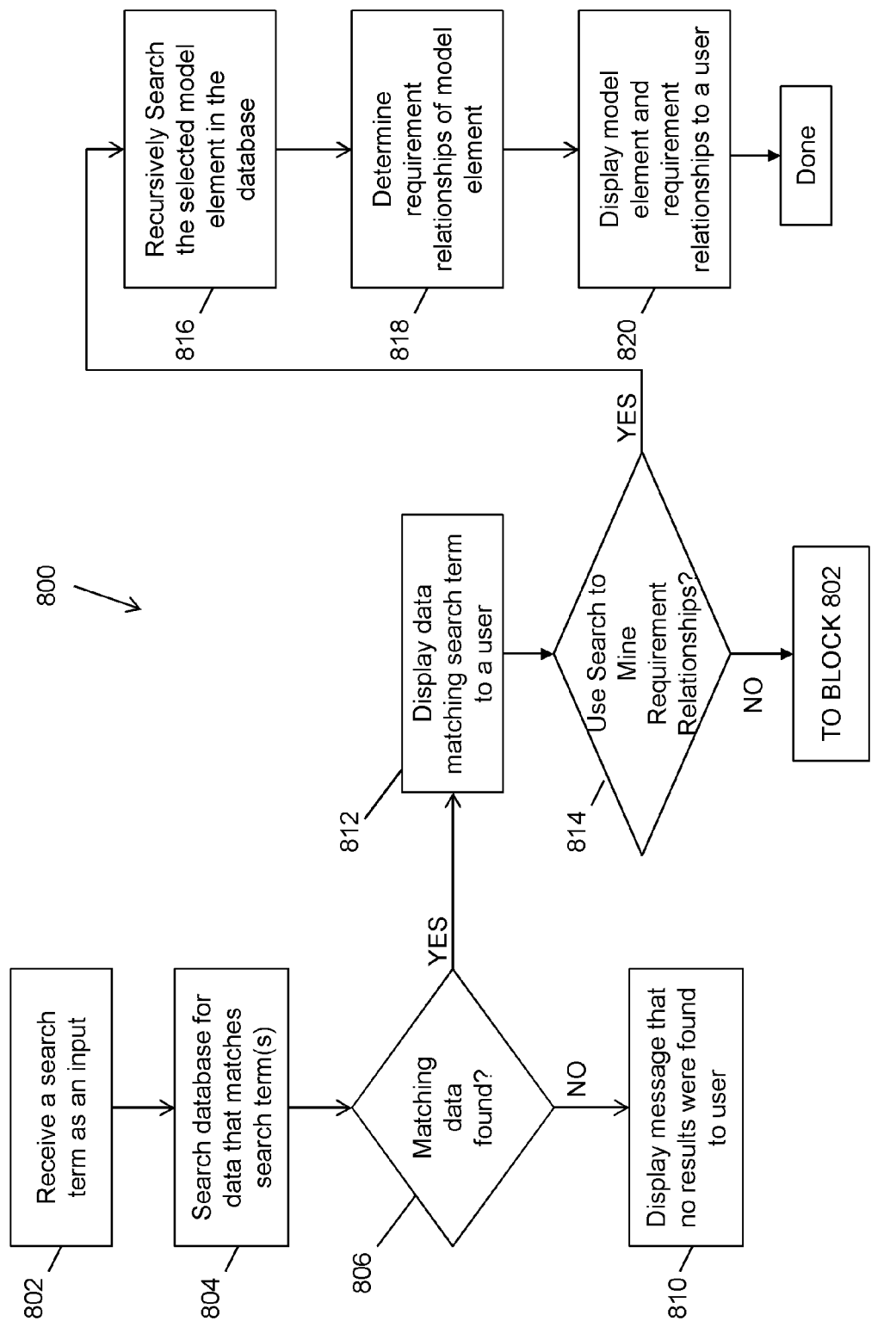
FIG. 8 is a flow diagram of one example of another method that may be performed by a requirements management tool.

FIG. 8 is another block diagram illustrating another method that may be performed by RMT 500. At block 802, the RMT 500 receives a search term as an input. The database 206 is searched by the RMT 500 to locate data in the database that matches the search term at block 804.

At decision block 806, RMT 500 determines if data matching the search term has been located in database 206. If data matching the search term is not located by RMT 500, then at block 810 a message is displayed to a user stating that matching data was not located. If data matching the search term is found in database 206, then at block 812 the matching data, such as a model element, is displayed to the user. At this point, the user may determine if the data retrieved by the initial search is what the user was interested in locating. At decision block 814, the RMT 500 determines if the requirement relationships of the data located by the search is to be mined. The RMT 500 may make this determination by waiting for the user to select the Run button 528 or for the user to enter a different search term or terms. If the user inputs a new search term, then the RMT 500 proceeds to block 802. Alternatively, if the user selects the Run button 528, then the RMT 500 proceeds to block 816 and recursively searches for the model element in database 206.

At block 818, the RMT 500 identifies all of the requirement relationships of the searched model element. The model elements and associated requirement relationships are displayed in accordance with the display options stored in the computer readable storage medium at block 820. In this manner, RMT 500 may perform a search for data in database 206.

In addition to the above described embodiments, the disclosed method and apparatus may be embodied in the form of computer-implemented processes and apparatus for practicing those processes. The present disclosed method and apparatus may also be embodied in the form of computer program code embodied in tangible media, such as floppy diskettes, read only memories (ROMs), CD-ROMs, hard drives, "ZIP™" high density disk drives, DVD-ROMs, blu-ray discs, flash memory drives, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes an apparatus for practicing the disclosed method and apparatus. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system for displaying requirement relationships between data of one of a UML or a SysML application, comprising:
    a non-transitory machine readable storage medium storing a plurality of data for a project designed using one of the UML or the SysML applications; and
    a processor in signal communication with the non-transitory machine readable storage medium, the processor configured to:
        search the non-transitory computer readable storage medium for a first model element of the project;
        identify a requirement relationship between the first model element and a second model element; and
        display the first model element and the second model element on a monitor such that the requirement relationship between the first model element and the second model element is identifiable to a user;
        wherein identifying the requirement relationship between the first model element and the second model element includes displaying a count of all requirements that have been satisfied, and a count of all requirements that have not been satisfied.

2. The system of claim 1, wherein the processor is further configured to:
    receive an instruction to modify data associated with the first model element; and
    modify the data associated with the first model element in the non-transitory computer readable storage medium in real time.

3. The system of claim 1, wherein the processor is further configured to:
    receive a display instruction, the display instruction identifying one or more requirement relationship types to display;
    store the display instruction in the non-transitory computer readable storage medium; and
    cause the first model element and the one or more requirement relationships to be displayed in accordance with the display instruction.

4. The system of claim 1, wherein the requirement relationship is one of a satisfaction, a derived, a refined, a verify, a decompose, a copy, and an allocation relationship.

5. The system of claim 1, wherein the processor is further configured to:
    receive a search term as an input;
    identify data matching the search term in the non-transitory computer readable storage medium; and
    cause the matching data to be displayed on the monitor.

6. The system of claim 5, wherein the processor is further configured to receive an instruction from the user to identify requirement relationships associated with the matching data.

7. The system of claim 1, wherein the processor is further configured to:
    receive an instruction to add a requirement relationship to the first model element;
    create the requirement relationship; and
    store the requirement relationship in the non-transitory computer readable storage medium.

8. The system of claim 1, wherein the processor is further configured to:
    cause one of a number of unsatisfied project requirements or satisfied project requirements to be displayed on the monitor.

9. The system of claim 8, wherein an unsatisfied project requirement includes project requirements in violation of one or more rules of the project being designed.

10. The system of claim 1, wherein one of the first and second model elements is a requirement of the project.

11. The system of claim 1, wherein the processor is further configured to:
    identify each requirement relationships between the first model element and each of a plurality of other model elements in the non-transitory machine readable storage medium; and
    display the first model element and each of the plurality of other model elements on the monitor such that the requirement relationships between the first model element and each of the plurality of other model elements is identifiable to the user.

12. A non-transitory computer readable storage medium encoded with program code, wherein when the program code is executed by a processor, the processor performs a method, the method comprising:
    searching for a first model element of a project designed using one of a UML or a SysML application;
    identifying a requirement relationship between the first model element and a second model element; and
    displaying the first model element and the second model element such that the requirement relationship between the first model element and the second model element is identifiable to a user;
    wherein identifying the requirement relationship between the first model element and the second model element includes displaying a count of all requirements that have been satisfied, and a count of all requirements that have not been satisfied.

13. The non-transitory computer readable storage medium of claim 12, wherein the method further comprises:
    receiving an instruction to modify data associated with the first model element; and
    modifying the data associated with the first model element in the computer readable storage medium in real-time.

14. The non-transitory computer readable storage medium of claim 12, wherein the method further comprises:
    receiving a display instruction, the display instruction identifying one or more requirement relationship types to display;
    storing the display requirement in a non-transitory computer readable storage medium; and causing the first model element and the one or more requirement relationships to be displayed in accordance with the display instruction.

15. The non-transitory computer readable storage medium of claim 12, wherein the requirement relationship is one of a satisfaction, a derived, a verify, a decompose, a copy, and an allocation relationship.

16. The non-transitory computer readable storage medium of claim 12, wherein the method further comprises:
receiving a search term as an input;
identifying data matching the search term in a non-transitory computer readable storage medium; and
causing the matching data to be displayed to a user.

17. The non-transitory computer readable storage medium of claim 16, wherein the method further comprises receiving an instruction from the user to identify requirement relationships associated with the matching data.

18. The non-transitory computer readable storage medium of claim 12, wherein the method further comprises:
receiving an input instruction to add a requirement relationship to the first model element;
creating the requirement relationship; and
storing the requirement relationship in a computer readable storage medium that includes the data for the project designed using one of the UML or SysML applications.

19. The non-transitory computer readable storage medium of claim 12, wherein the method further comprises displaying a number of unsatisfied project requirements to a user.

20. The non-transitory computer readable storage medium of claim 19, wherein an unsatisfied project requirement includes project requirements in violation of one or more rules of the project being designed.

21. A method for displaying requirement relationships between data of one of a UML or a SysML application, the method comprising:
searching for a first model element of a project designed using one of a UML or a SysML application, in a computer process;
identifying a requirement relationship between the first model element and a second model element, in another computer process; and
displaying the first model element and the second model element such that the requirement relationship between the first model element and the second model element is identifiable to a user, wherein identifying the requirement relationship between the first model element and the second model element includes displaying a count of all requirements that have been satisfied, and a count of all requirements that have not been satisfied.

22. The method of claim 21, further comprising:
receiving an instruction to modify data associated with the first model element; and
modifying the data associated with the first model element in real-time.

23. The method of claim 21, further comprising:
receiving a display instruction, the display instruction identifying one or more requirement relationship types to display;
storing the display requirement in a computer readable storage medium; and
causing the first model element and the one or more requirement relationships to be displayed in accordance with the display instruction.

24. The method of claim 21, wherein the requirement relationship is one of a satisfaction, a derived, a verify, a decompose, a copy, and an allocation relationship.

25. The method of claim 21, further comprising:
receiving a search term as an input;
identifying data matching the search term in a computer readable storage medium; and
causing the matching data to be displayed to a user.

26. The method of claim 25, further comprising receiving an instruction from the user to identify requirement relationships associated with the matching data.

27. The method of claim 21, wherein the method includes:
receiving an input instruction to add a requirement relationship to the first model element;
creating the requirement relationship; and
storing the requirement relationship in a computer readable storage medium that includes the data for the project designed using one of the UML or SysML applications.

28. The method of claim 21, further comprising displaying a number of unsatisfied project requirements to a user.

29. The method of claim 28, wherein an unsatisfied project requirement includes project requirements in violation of one or more rules of the project being designed.

* * * * *